United States Patent [19]

Masui et al.

[11] Patent Number: 5,280,994
[45] Date of Patent: Jan. 25, 1994

[54] STRUCTURE FOR FIXING CARPET ON SEATBACK

[75] Inventors: Toshio Masui; Yasuyuki Seura, both of Kanagawa, Japan

[73] Assignee: Ikeda Bussan Co., Ltd., Ayase, Japan

[21] Appl. No.: 780,067

[22] Filed: Oct. 21, 1991

[30] Foreign Application Priority Data

Oct. 24, 1990 [JP] Japan .................................. 2-111494

[51] Int. Cl.⁵ .............................................. A47C 31/02
[52] U.S. Cl. .......................... 297/219.1; 297/DIG. 6; 297/452.38
[58] Field of Search ................ 297/218, 219, 378, 379, 297/463, DIG. 6

[56] References Cited

U.S. PATENT DOCUMENTS

3,695,690 10/1972 Carson ...................... 297/DIG. 6 X
4,740,035 4/1988 Kazaoka et al. ................. 297/219 X

FOREIGN PATENT DOCUMENTS

1143275 2/1969 United Kingdom ................ 297/219

*Primary Examiner*—Peter R. Brown
*Attorney, Agent, or Firm*—Foley & Lardner

[57] ABSTRACT

A foldable seat assembly includes a seat cushion, a seatback, a base plate secured to the seat cushion, a seatback bracket, and a carpet. The seatback bracket is pivotally connected to the base plate and fixedly secured to a corner portion of a back surface of the seatback for allowing the seatback to be forwardly folded down on the seat cushion. The back surface of the seatback is covered with the carpet. A corner portion of the carpet is fixed on the seatback bracket through a fastener.

7 Claims, 2 Drawing Sheets

STRUCTURE FOR FIXING CARPET ON SEATBACK

BACKGROUND OF THE INVENTION

1. Field of the Invention

The present invention relates in general to a structure for fixing a carpet on a seatback, and more particularly to a structure for fixing a carpet on a back surface of a seatback of a foldable rear seat for a motor vehicle.

2. Description of the Prior Art

In automobiles, such as a station wagon, a hatchback or the like, a so-called "foldable seat" is employed as a rear, seat for obtaining larger luggage space. Upon a requirement for a larger luggage space, a seatback of the foldable seat is inclined forward and folded down on a seat cushion of the same. With this, the space defined above the folded seatback can be used as an extra luggage space.

In order to clarify the task of the present invention, one conventional foldable seat will be outlined with reference to FIG. 5 of the accompanying drawings.

As is seen from FIG. 5, the foldable seat 10 has a hinge mechanism 12 for inclining a seatback 14. The hinge mechanism 12 comprises a base plate 16 which is secured to a rear end portion of a side surface of a seat cushion 18 and a seatback bracket 20 which is pivotally connected to the base plate 16. The seatback bracket 20 is made of a metal plate which has a substantially L-shaped cross section. The seatback bracket 20 is secured to a rear corner portion of a back surface of the seatback 14 through bolts 22 or the like.

The back surface of the seatback 14 is usually covered with a carpet 24 for protecting the seatback 14 when luggage is placed on the folded seatback 14, and for improving the external appearance of the seatback 14. The carpet 24 is so sized as to cover the substantially entire back surface of the seatback 14. The carpet 24 is secured at its peripheral portion to a peripheral portion of the back surface of the seatback 14 through a plurality of pins 26 or the like.

However, the above-mentioned conventional foldable seat 10 has the following drawback.

A rear corner portion of the carpet 24 is not directly secured to a rear corner portion of the back surface of the seatback through pins 26 because the seatback bracket 20 interferes with the fixation of the pin 26. Therefore, the rear corner portion of the carpet 24 tends to be turned up. This degrades the external appearance of the carpet 24 and the durability of the same.

SUMMARY OF THE INVENTION

It is therefore an object of the present invention to provide a structure for fixing a carpet on a seatback, through which structure a rear corner portion of a carpet is fixedly placed on a back surface of a seatback of a foldable seat.

According to the present invention, there is provided a foldable seat assembly including: a seat cushion; a seatback; a base plate secured to the seat cushion; a seatback bracket which is pivotally connected to the base plate and fixedly secured to a corner portion of a back surface of the seatback for allowing the seatback to be forwardly folded down on the seat cushion; a carpet for covering the back surface of the seatback; and means for fixing a corner portion of the carpet on the seatback bracket.

DESCRIPTION OF THE PREFERRED EMBODIMENT

Figure 1:
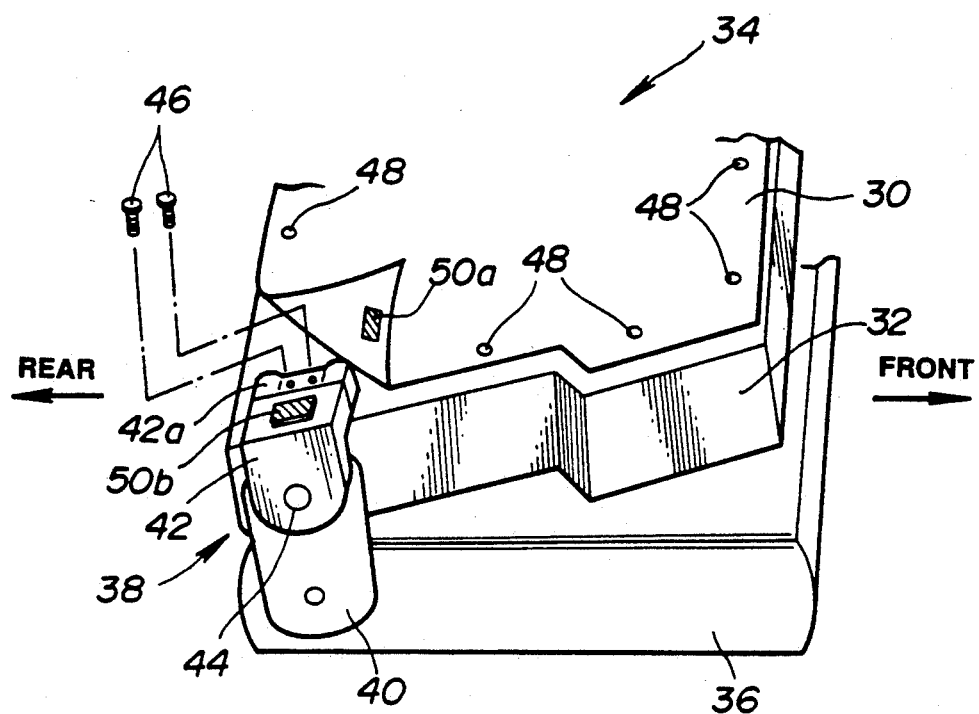
FIG. 1 is a perspective partial view of a foldable seat, showing a condition in which a seatback is forwardly folded down on a seat cushion, and showing a structure for fixing a carpet on the seatback, which structure is a first embodiment of the present invention.
Figure 2:
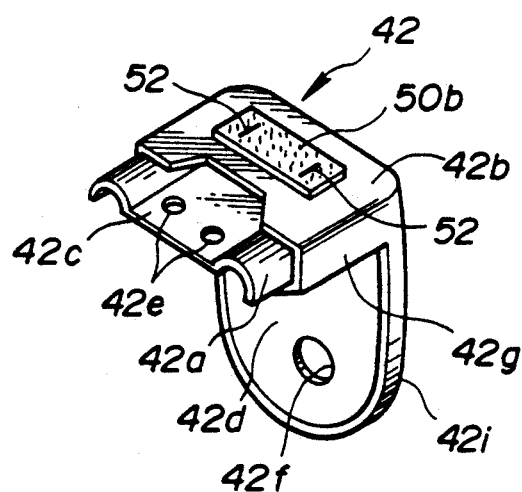
FIG. 2 is a perspective view of a seatback bracket according to the first embodiment of the present invention.

Referring to FIGS. 1 and 2, there is shown a structure for fixing a carpet 30 on a seatback 32 of a so-called "foldable rear seat" 34, which is a first embodiment of the present invention.

As is seen from FIG. 1, when the seatback 32 is inclined forward and folded down on a seat cushion 36 of the seat 34, the space defined above the folded seatback 32 can be used as an extra luggage space.

The seat 34 has a hinge mechanism 38 for inclining the seatback 32. The hinge mechanism 38 comprises a base plate 40 which is secured to a rear end portion of a side surface of the seat cushion 36 and a seatback bracket 42 which is pivotally connected to the base plate 40 through a pivot pin 44.

As is seen from FIG. 2, the seatback bracket 42 comprises a metal plate 42a which has a substantially L-shaped cross section, and a cover member 42b which has a substantially L-shaped cross section and is made of synthetic resin or the like. The metal plate 42a comprises a first substantially flat portion 42c and a second flat portion 42d unites with the first portion 42c at substantially a right angle. The first portion 42c of the metal plate 42a has two bolt holes 42e formed therethrough. The second portion 42d of the metal plate 42a has a through hole 42f for receiving therein the pivot pin 44. The cover member 42b comprises a first portion 42g and a second portion 42i which units with the first portion 42g at substantial a right angle. The cover member 42b is detachably fixed to the metal plate 42a so as to entirely cover an outer surface of the portion 42d of the metal plate 42a and partially cover an outer surface of the first portion 42c of the metal plate 42a, partially, as illustrated. The cover member 42b serves not to expose the metal plate 42a of the seatback bracket 42.

Referring back to FIG. 1, the seatback bracket 42 is secured to a rear corner portion of a back surface of the seatback 32 through two bolts 46.

The aforementioned carpet 30 is secured to the back surface of the seatback 32 through a plurality of pins 48 or the like except for a rear corner portion of the carpet 30 which is not connected by pins 48. Carpet 30 substantially covers the entire back surface of the seatback 32. Because of the presence of the seatback bracket 42 on the rear corner portion of the back surface of the seatback 32, it is difficult to secure the rear corner portion of the carpet 30 to the seatback 32 using pins 48. Therefore, a faster (no numeral) is employed in the present invention.

The fastener is made of hook and eye tape, a magnet, or the like. The fastener comprises first and second paired members 50a and 50b which are to be engaged with each other.

The first member 50a of the fastener is secured to the rear corner portion of the carpet 30. The second member 50b of the fastener is secured to the cover member 42b of the seatback bracket 42 through staples 52 or the like (see FIG. 2). Each staple 52 is generally U-shaped and has pointed ends for fixing the second member 50b of the fastener on the cover member 42b of the seatback bracket 42. The pointed ends of the staple 52 is easily driven into the first portion 42g of the cover member 42b because the cover member 42b is made of synthetic resin or the like. The second member 50b is so positioned as to be engaged with the first member 50a. With pressing the rear corner portion of the carpet 30 onto the seatback bracket 42, the rear corner portion of the carpet 30 is fixed to the seatback 32 through the fastener. Thus, the fastener can prevent the rear corner portion of the carpet 30 from being turned up.

Figure 3:
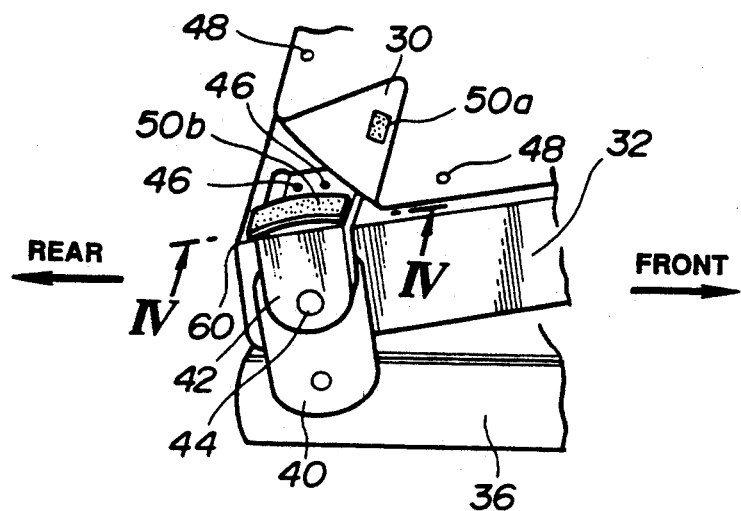
FIG. 3 is a view similar to FIG. 1, but showing a second embodiment.
Figure 4:
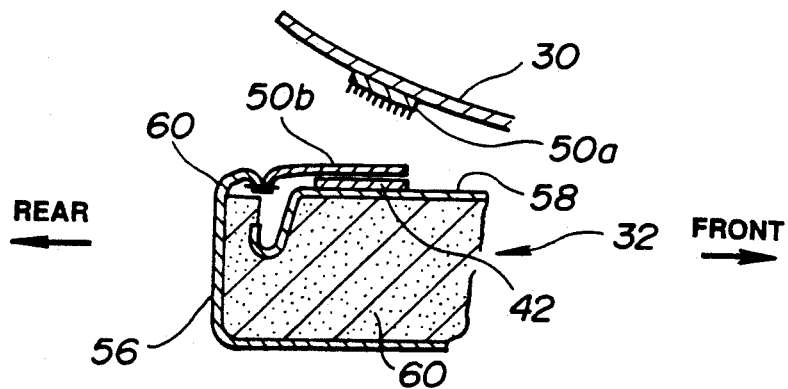
FIG. 4 is a partial and sectional view of a seatback, which is taken along the line IV—IV of FIG. 3.
Figure 5:
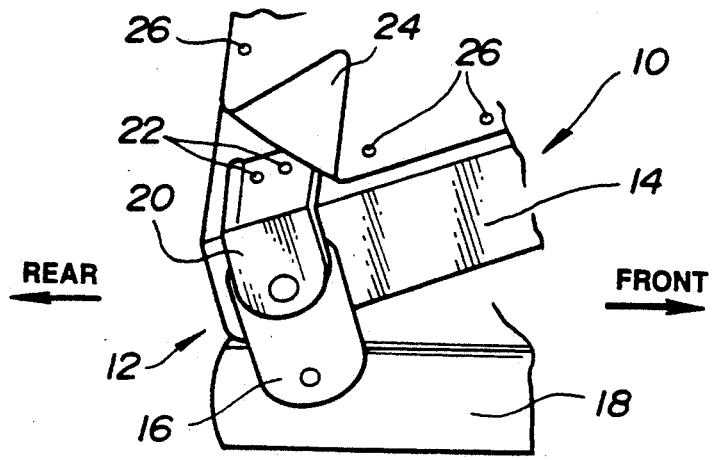
FIG. 5 is a view similar to FIG. 1, but showing a conventional structure for fixing a carpet on a seatback.

Referring to FIGS. 3 and 4, there is shown a structure for fixing a carpet on a seatback of a foldable rear seat, which is a second embodiment of the present invention.

Parts substantially the same as those of the above-mentioned first embodiment are denoted by the same numerals and a detailed explanation of them will be omitted from the following description.

As is seen from FIG. 4, unlike the first embodiment, the second member 50b of the fastener is sewed at its one end to an end portion of an outer skin member 56 of the seatback 32. Designated by numerals 58 and 60 are a seatback frame and a pad member, respectively. The second member 50b of the fastener is so sized and positioned that a major front portion of the same is placed on the seatback bracket 42 so as to be engaged with the first member 50a of the fastener.

Although the second member 50b of the fastener is not directly secured to the, seatback bracket 42, the second member 50b is placed at its major front portion on the seatback bracket 42 and sewed to the end portion of the outer skin member 56, the end portion being positioned between a comer 60 of the back surface of the seatback 32 and the seatback bracket 42 (see FIGS. 3 and 4). Therefore, upon engaging the first member 50a with the second member 50b, the rear corner portion of the carpet 30 is fixed on the seatback bracket 42 through the fastener. Thus, the fastener can prevent the rear corner portion of the carpet from being turned up.

Unlike the first embodiment, the first portion 42g of the cover member 42b of the second embodiment can be omitted or substantially shortened, because the second member 50b of the fastener is not directly secured to the seatback bracket 42, and the first portion 42c of the metal plate 42a is substantially covered with the carpet 30.

What is claimed is:

1. A foldable seat assembly comprising:
   a seat cushion;
   a seatback;
   a base plate secured to said seat cushion;
   a seatback bracket which is pivotally connected to said base plate and fixedly secured to a corner portion of a back surface of said seatback for allowing said seatback to be forwardly folded down on said seat cushion;
   a carpet for covering said back surface of said seatback; and
   means for fixing a corner portion of said carpet on said seatback bracket.

2. A foldable seat assembly as claimed in claim 1, in which said fixing means includes a fastener comprising first and second paired members, said first member being secured to said corner portion of said carpet and said second member being secured to said setback bracket and being engageable with said first member.

3. A foldable seat assembly as claimed in claim 2, in which said seatback bracket comprises a metal plate and a cover member for covering said metal plate.

4. A foldable seat assembly as claimed in claim 3, in which said second member is directly fastened to said cover member so as to be engageable with said first member.

5. A foldable seat assembly as claimed in claim 3, in which said cover member is made of synthetic resin.

6. A foldable seat assembly as claimed in claim 5, in which said second member is directly fastened to said cover member through a staple which is driven into said cover member.

7. A foldable seat assembly as claimed in claim 2, in which said fastener is made of hook and eye tape.

* * * * *